United States Patent
Patekar

(10) Patent No.: US 9,037,574 B1
(45) Date of Patent: *May 19, 2015

(54) DATABASE REPORT AND SUBSCRIPTION TECHNOLOGY

(71) Applicant: MicroStrategy Incorporated, Vienna, VA (US)

(72) Inventor: Kaustubh Patekar, Sunnyvale, CA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,714

(22) Filed: Jul. 22, 2013

Related U.S. Application Data

(63) Continuation of application No. 12/906,779, filed on Oct. 18, 2010, now Pat. No. 8,521,733.

(60) Provisional application No. 61/253,006, filed on Oct. 19, 2009.

(51) Int. Cl.
    *G06F 17/30* (2006.01)

(52) U.S. Cl.
    CPC ............... *G06F 17/30522* (2013.01)

(58) Field of Classification Search
    CPC ............................................. G06F 17/30522
    USPC ....................................................... 707/722
    See application file for complete search history.

(56) References Cited

U.S. PATENT DOCUMENTS

| | | |
|---|---|---|
| 2003/0233366 A1 | 12/2003 | Kesselman et al. |
| 2004/0073482 A1 | 4/2004 | Wiggins et al. |
| 2005/0222890 A1 | 10/2005 | Cheng et al. |
| 2007/0016561 A1 | 1/2007 | Laustsen |
| 2008/0208906 A1 | 8/2008 | Penner |

OTHER PUBLICATIONS

U.S. Non-Final Office Action for U.S. Appl. No. 12/906,779 dated Oct. 11, 2012, 14 pages.
U.S. Notice of Allowance for U.S. Appl. No. 12/906,779 dated Jun. 20, 2013, 9 pages.

*Primary Examiner* — Etienne Leroux
*Assistant Examiner* — Jared Bibbee
(74) *Attorney, Agent, or Firm* — Fish & Richardson P.C.

(57) ABSTRACT

Database report subscription technology, in which subscriptions are delivered to multiple, different recipients on a customized basis. In response to detection of an event that triggers generation and delivery of a database report, customized versions of the report are generated for the multiple, different recipients based on a definition of the data used to generate the report included in the subscription, report parameters that define presentation aspects of the report included in the subscription, and profile data associated with at least one of the multiple, different recipients. The customized versions of the report include at least a first version of the report and a second version of the report that differs from the first version of the report and the customized versions of the report are delivered to the multiple, different recipients.

20 Claims, 16 Drawing Sheets

Inventory Received from Suppliers by Quarter

History List

| Subscription Name | Owner | Schedule | Recipient | Address | Personalized | Action |
|---|---|---|---|---|---|---|

You do not have any history list subscriptions

Add history list subscription

**\*Mobile\***

| Subscription Name | Owner | Schedule | Recipient | Address | Personalized | Action |
|---|---|---|---|---|---|---|

You do not have any mobile subscriptions

\*Add mobile list subscription\*

Email

| Subscription Name | Owner | Schedule | Recipient | Address | Personalized | Action |
|---|---|---|---|---|---|---|

You do not have any email subscriptions

Add email subscription — 410

File

| Subscription Name | Owner | Schedule | Recipient | Address | Personalized | Action |
|---|---|---|---|---|---|---|

You do not have any file subscriptions

Add file subscription

Print

| Subscription Name | Owner | Schedule | Recipient | Address | Personalized | Action |
|---|---|---|---|---|---|---|

You do not have any print subscriptions

Add print subscription

History List — 810

| Name | Owner | Schedule | Recipient | Personalized | Action | Unsubscribe |
|---|---|---|---|---|---|---|
| Weekly Sales Update | Designer | Monday Morning | + Multiple | Yes | Personalize Edit | ☐ |

Email — 820

| Name / Report/Document | Owner | Schedule | Recipient | Personalized | Action | Unsubscribe |
|---|---|---|---|---|---|---|
| Weekly Inventory Data | Designer | Monday Morning | Store Owners | Yes | Personalize Edit | ☐ |
| Summary Sales Document | Designer | 1st Thursday of Month | − Multiple | Yes | Personalize Edit | ☐ |
| | | | Sales (Leads) | Yes | Personalize Edit | ☐ |
| | | | Sales (VPs) | Yes | Personalize Edit | ☐ |
| | | | User2 | Yes | Personalize Edit | ☐ |

File — 830

| Subscription Name | Report/Document | Owner | Schedule | Recipient | Personalized | Action | Unsubscribe |
|---|---|---|---|---|---|---|---|
| Transaction Details Last Month June 23, 2007 5:30 PM | Transaction Details Last Month | Admin | 1st of Month | Designer | No | Personalize Edit | ☐ |

Print — 840

| Name | Owner | Schedule | Recipient | Personalized | Action | Unsubscribe |
|---|---|---|---|---|---|---|
| Summary Sales Document | Designer | 1st Thursday of Month | User | Yes | Personalize Edit | ☐ |

History List

| Subscription Name | Report / Document | Owner | Schedule | Recipient | Personalized | Action | Unsubscribe |
|---|---|---|---|---|---|---|---|
| Product Sales by Region March 1, 2007 10:32 AM | Product Sales by Region | User | 1st of Month | User | Yes | Personalize  Edit | ☐ |
| Weekly Sales Update Jan 23, 2007 5:30 PM | Weekly Sales Update | Designer | Monday Morning | User | No | | ☐ |

Email

| Subscription Name | Report / Document | Owner | Schedule | Recipient | Personalized | Action | Unsubscribe |
|---|---|---|---|---|---|---|---|
| Monday Morning Regional Sales | Product Sales by Region | User | Monday Morning | +Multiple | Yes | Personalize | ☐ |
| Sales in Mclean Store Jan 23, 2007 5:30 PM | Sales in Mclean Store | Manager | Daily | User | No | | |
| Weekly Inventory Data Jan 23, 2007 5:30 PM | | Designer | Monday Morning | Store Owners | No | | ☐ |
| Summary Sales Document Jan 23, 2007 5:30 PM | | Designer | 1st Thursday of Month | User | No | | ☐ |

File

| Subscription Name | Report / Document | Owner | Schedule | Recipient | Personalized | Action | Unsubscribe |
|---|---|---|---|---|---|---|---|
| Transaction Details Last Month Jane 23, 2007 5:30 PM | Transaction Details Last Month | Designer | 1st of Month | User | Yes | Personalize  Edit | ☐ |

Print

| Name | Owner | Schedule | Recipient | Personalized | Action |
|---|---|---|---|---|---|
| Summary Sales Document | Designer | 1st Thursday of Month | User | Yes | Personalize |

Column labels: 1010, 1020, 1030, 1040, 1050, 1060, 1070, 1080

| | | |
|---|---|---|
| | Subscription | |
| 1105 | Subscription | |
| 1110 | Name: | Product Sales by Region |
| 1115 | Report: | Product Sales by Region |
| 1120 | Schedule: | Sales Alert |
| 1125 | To: | user@microstrategy.com ▼ |
| 1130 | Send: | Data in email ▼ |
| 1135 | Format: | Excel   ☐ Compress |
| 1140 | Subject: | Product Sales by Region |
| | Message | [                    ] |

1145 — ☐ Send a preview now

Advanced Options

1150 — ☐ Protect Zip File
1155 — Zip File Name      Product Sales by Region
1160 — Expiration Date 1165 — [ OK ]   [ Cancel ] — 1170

DATABASE REPORT AND SUBSCRIPTION TECHNOLOGY

CROSS-REFERENCE TO RELATED APPLICATIONS

This application is a continuation (and claims the benefit of priority under 35 USC 120) of U.S. application Ser. No. 12/906,779, filed Oct. 18, 2010, which claims the benefit to U.S. Provisional Application No. 61/253,006, filed Oct. 19, 2009. Both of these applications are incorporated herein by reference in their entirety.

TECHNICAL FIELD

This disclosure relates to database report and subscription technology.

BACKGROUND

Computer systems are used to manage and store data. As such, they may be used to analyze data and generate reports based on the analysis results. For instance, computer systems may filter data and calculate metric values based on the filtered data, ultimately providing a report including the calculated metric values.

SUMMARY

In one aspect, this disclosure relates to database report and subscription technology.

Implementations of any of the techniques described throughout the disclosure may include a method or process, a system, or instructions stored on a computer-readable storage device. The details of particular implementations are set forth in the accompanying drawings and description below. Other features will be apparent from the following description, including the drawings, and the claims.

DESCRIPTION OF DRAWINGS

FIGS. 4-8 and 10-12 are diagrams of exemplary interfaces.

DETAILED DESCRIPTION

Techniques are described for database report technology that allows an end user to send reports to others users on a scheduled basis. With multiple recipient subscriptions, each recipient of such a subscription can have different personalization that is set by an owner of the subscription or the recipient, if allowed by the owner. The multiple recipient subscriptions enable subscription management by a single entity and offer personalization by recipients.

In some implementations, subscriptions are personalized based on dynamic selection of security and/or personalization profiles and address information for recipients of the subscription. In these implementations, recipient users view subscriptions sent by others and are able to change personalization for their own part of the subscription without affecting that of other recipients.

Figure 1:
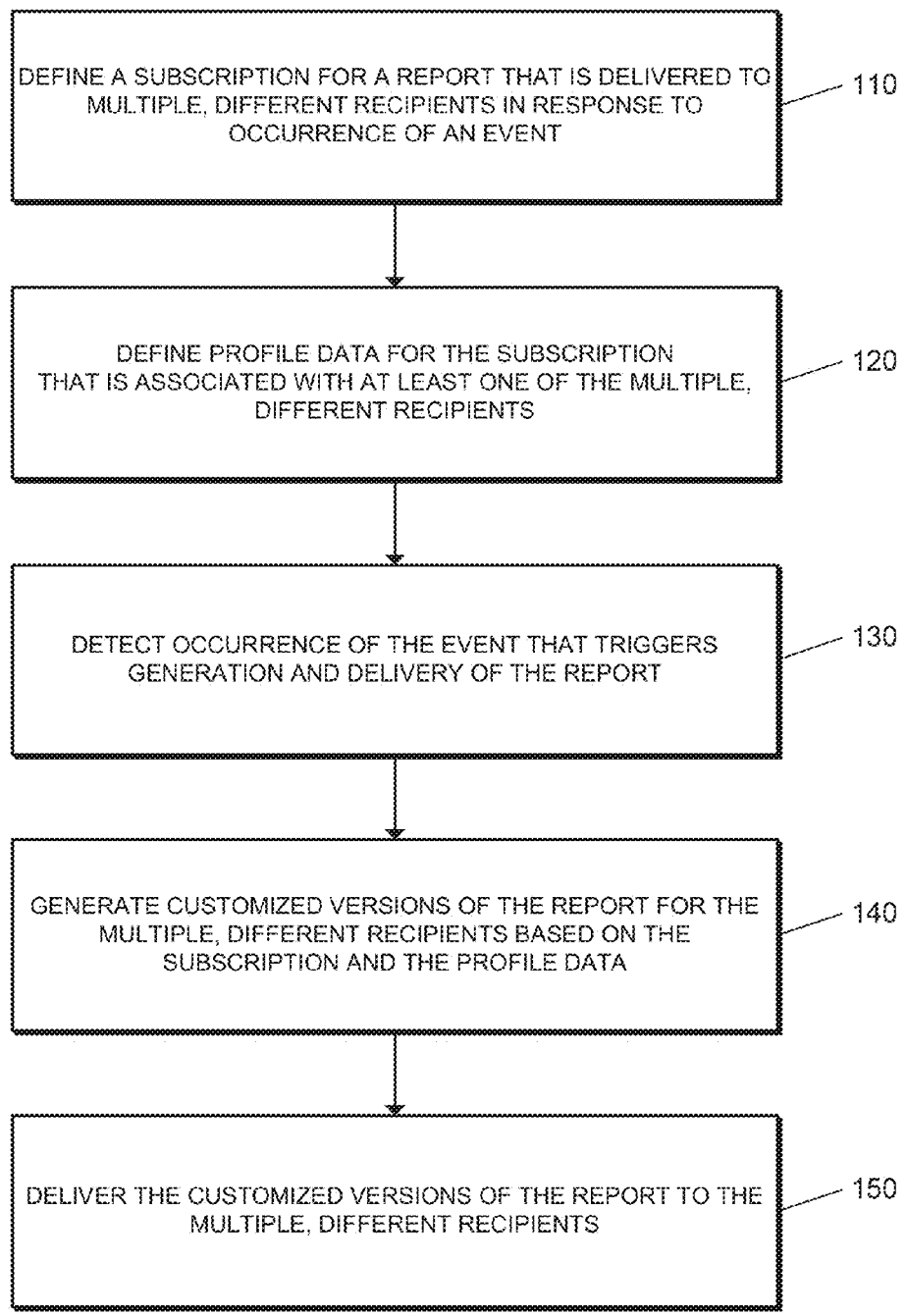
FIGS. 1, 3, 9, and 13 are flowcharts of exemplary processes.

FIG. 1 illustrates an example process 100 for delivering customized versions of a report to multiple, different recipients. The process shown in FIG. 1 is described generally as being performed by a processor. In some implementations, the process shown in FIG. 1 may be performed by one or more processors included in one or more electronic devices or may be performed any type of electronic device (e.g., a server, a computer, etc.).

The processor defines a subscription for a report that is delivered to multiple, different recipients in response to occurrence of an event (110). For example, the processor accesses user input provided by a user to define one or more attributes of a desired subscription and stores, in electronic storage, data defining the subscription based on the one or more attributes. In this example, the data defining the subscription may include an event that triggers generation and delivery of the report. The event may be a recurring time schedule, a data change occurrence, a data load occurrence, or any other type of event that may be detected and used to trigger generation and delivery of the report.

The data defining the subscription also may include identification of the multiple, different recipients to which the report is delivered. The identification of the multiple, different recipients may include user names associated with the multiple, different recipients, contact addresses (e.g., email addresses) associated with the multiple, different recipients, and/or device identifiers associated with devices used by the multiple, different recipients.

The list of recipients also may be populated from a different report, table in the database, or other sources. In some examples, a "dynamic recipient list" may be combined with multiple recipient subscriptions to provide a flexible subscription solution.

Further, the data defining the subscription may include definition of data used to generate the report. The definition of data may include an identification of one or more databases and/or one or more database tables from which the data used to generate the report is accessed. The definition of data also may include one or more queries that define which type of data to access in generating the report. For instance, the processor may execute the one or more queries against the one or more database tables to identify data used to generate the report.

In addition, the data defining the subscription may include report parameters that define presentation aspects of the report. The report parameters may define a color, theme, style, layout, and any other visual aspects of the report. The report parameters may define a type of visual aid to use in representing the defined data in the report, such as a combination of one or more of a bar graph, a pie chart, a line graph, etc. The report parameters further may define a type of file or delivery mechanism used in generating the report. For example, the report parameters may define whether the report is generated as a portable document format (PDF) file, a word processing document file, a hypertext markup language (HTML) file, or any other type of presentation file. The report parameters also may define whether the report is delivered in as an attachment to an electronic mail message, within the body of an electronic mail message, as a hard copy printed report, as a stored file, or as any other type of delivery mechanism available for reports.

The processor also may access user input provided by a user to define recipient customization settings that define ability of recipients to customize the subscription and store, in electronic storage, data defining the recipient customization settings in association with the subscription. The recipient customization settings may define whether or not recipients are permitted to customize attributes of the subscription at all. If recipients are allowed to customize attributes of the subscription, the recipient customization settings may define which attributes the recipients are allowed to customize. For instance, the recipient customization settings may indicate that recipients are allowed to customize the report parameters that define presentation aspects of the report, but not allowed customize the definition of data used to generate the report or the event that triggers generation and delivery of the report. In some implementations, the recipient customization settings may allow recipients to customize all attributes of the subscription or any subset of the attributes of the subscription. Certain recipients may be given greater ability to customize a subscription than other recipients.

In some examples, the processor may receive user selection of recipients of the report from a list of names of potential recipients (e.g., a list of user names of employees of a company) without specifying a communication address of selected recipients. In these examples, the processor determines the communication address associated with each of the selected recipients to enable the processor to deliver the report to the selected recipients.

In some implementations, the processor may receive user selection of a contact group that automatically includes multiple, different recipients. The processor may identify the users associated with the contact group and store communication information for the identified users as part of the subscription. Allowing a user to select a contact group may enable the user to define a large number of recipients quickly and easily. Defining a subscription for a report is described in more detail below with respect to FIG. 3.

The processor identifies, for the subscription, profile data that is associated with at least one of the multiple, different recipients (120). For instance, the processor may identify customization data (e.g., a personalization profile) for one or more of the multiple, different recipients. The customization data may be defined for the subscription specifically or may be defined more generally to cover any subscriptions the recipient receives. The customization data may be received after the subscription has been defined or may be pre-set in advance of the subscription definition.

In some examples, one or more of the multiple, different recipients may provide user input that defines one or more modifications to the subscription (e.g., the subscription specifically or subscriptions in general). In these examples, the processor stores, in electronic storage, data defining the one or more modifications in a profile associated with the corresponding recipient. For instance, the processor may define, based on user input received from a particular recipient included in the multiple, different recipients, profile data for the subscription that is associated with the particular recipient and that defines a modification to the definition of data used to generate the report defined by the subscription.

The processor also may define, based on user input received from a particular recipient included in the multiple, different recipients, profile data for the subscription that is associated with the particular recipient and that defines a modification to the report parameters that define presentation aspects of the report defined by the subscription. The modification to the report parameters may include a modification to visual display parameters of the report defined by the subscription. The modification to the report parameters also may include a modification to a delivery mechanism of the report defined by the subscription.

In some implementations, the profile data may include location data. In these implementations, the location data may be used to customize the report based on the location of the recipient receiving the report. For instance, when a first recipient is an employee in a western office of a company, the first recipient may receive a report that includes data related to the western office. When a second recipient is an employee in an eastern office of the company, the second recipient may receive a report that includes data related to the eastern office. The location data also may be used to customize a language in which the processor generates the report and other delivery aspects that are preferred for recipients in the corresponding location (e.g., a particular file format, etc.).

The profile data also may include a security profile that defines which data (e.g., which databases or database tables) a recipient has security clearance to access. The security profile may be pre-set in advance of the subscription definition and may modify the definition of data used in generating the report to correspond to the security profile of the recipient. For instance, a first recipient with full security clearance may receive the report without modification of the definition of data, whereas a second recipient with a more restrictive security clearance may receive the report with the definition of data modified to exclude data the second recipient is not permitted to access based on the second recipient's security profile.

In some implementations, the processor may identify (e.g., define) a separate profile for each of the multiple, different recipients included in a selected contact group. Each of the separate profiles may be different such that each recipient in the selected contact group receives a different version of the report for the same subscription.

Further, the processor may identify (e.g., define) particular profile data for a particular recipient included in the multiple, different recipients. The particular profile data impacts the report delivered to the particular recipient without impacting other recipients included in the multiple, different recipients. Identifying profile data that is associated with at least one of the multiple, different recipients is described in more detail below with respect to FIG. 9.

The processor detects occurrence of the event that triggers generation and delivery of the report (130). For example, the processor may detect that a particular date and/or time has occurred at which the report is scheduled to be generated and delivered. In this example, a subscription may define that a report is to be delivered every Monday at noon and the processor may detect that the day is a Monday and time is noon.

The processor also may detect a data event (e.g., a data change occurrence, a data load occurrence, etc.) that triggers generation and delivery of the report. For instance, the processor may detect new data being loaded to a database or may detect a replication process updating data stored in a database.

The processor further may detect a user input command that triggers generation and delivery of the report. The subscription may indicate that the report is to be delivered in response to a user input command entered by a user and the processor may detect receipt of the user input command.

The processor generates customized versions of the report for the multiple, different recipients based on the subscription and the profile data (140). For instance, the processor may access the subscription data and the profile data and generate a report for each of the recipients based on the accessed data. The processor may first generate a general report using the subscription data and then modify the general report based on the profile data for each recipient.

In some examples, the processor accesses profile data for a particular recipient that includes a modification to the definition of data used to generate the report and generates a customized version of the report for the particular recipient based on the modification to the definition of data used to generate the report. The processor also may access profile data for a particular recipient that includes a modification to the report parameters that define presentation aspects of the report and generates a customized version of the report for the particular recipient based on the modification to the report parameters that define presentation aspects of the report. The modification to the report parameters may involve customizing visual display parameters of the report and/or a delivery mechanism of the report.

In some implementations, the processor accesses security profile data for a particular recipient and generates a customized version of the report for the particular recipient based on the security profile such that the version of the report for the particular recipient only includes the data the particular recipient is able to access regardless of whether the definition of data used to generate the report includes additional data. Further, the processor may customize the report using location profile data by, for example, modifying the definition of data to include only locale-specific data, changing the language used in the report, and/or modifying a file format in which the report is delivered. Generating customized versions of the report is described in more detail below with respect to FIG. 13.

The processor delivers the customized versions of the report to the multiple, different recipients (150). For instance, the processor sends the report as an attachment (or within the body of) an electronic mail message to one or more of the multiple, different recipients. The processor also may store, in electronic storage, the report as a file that is accessible to one or more of the multiple, different recipients. The processor further may initiate a process that causes a hard copy of the report to be printed and delivered to one or more recipients. In addition, the processor may cause the report to be delivered to one or more mobile devices. The processor may use the same delivery mechanism for all of the recipients of the report or may use a combination of different delivery mechanisms for the recipients of the report. The processor may determine which delivery mechanism to use for a particular recipient based on the profile data for the particular recipient.

Figure 2:
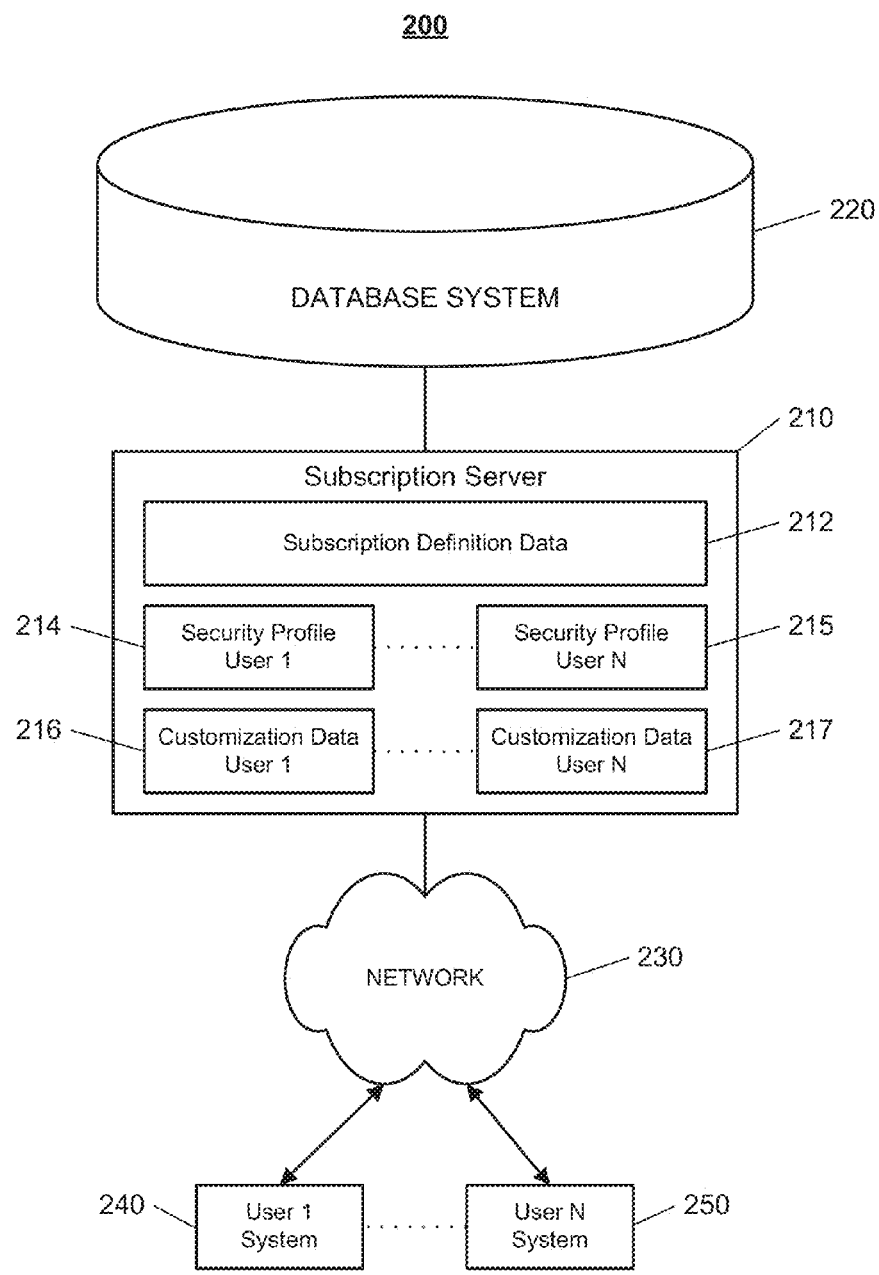
FIGS. 2 and 16 are diagrams of exemplary systems.

FIG. 2 illustrates an example system 200. The system 200 includes a subscription server 210, a database system 220, a network 230, and multiple user systems 240 and 250. The network 230 enables the subscription server 210 and the multiple user systems 240 and 250 to exchange electronic communications.

The subscription server 210 is an electronic device configured to execute programs, access data from the database system 220, and exchange communications with the multiple user systems 240 and 250 over the network 230. The subscription server 210 includes electronic storage (e.g., memory, a hard drive, etc.) that stores subscription definition data 212, security profile data for a first user 214, security profile data for an Nth user 215, customization data for a first user 216, and customization data for an Nth user 217. The subscription server 210 accesses, from electronic storage, the subscription definition data 212, the security profile data for a first user 214, the security profile data for an Nth user 215, the customization data for a first user 216, and the customization data for an Nth user 217 and uses the accessed data to generate and deliver customized report to systems of the first user and the Nth user. Although FIG. 2 illustrates two sets of security profile and customization data for brevity, actual implementations may include more (and, perhaps, many more) sets of security profile and customization data.

The database system 220 is an electronic device configured to store data and exchange communications with the subscription server 210 (e.g., multiple servers or computers) over a direct connection or network. For example, the database system 220 may be configured to store an organization's data and output the organization's data in response to requests (e.g., SQL statements or queries). In this example, the database system 220 may exchange communications with the subscription server 210 to receive input defining data needed from the database system 220 and provide the data needed as output to the subscription server 210. The database system 220 may include one or more databases and/or data warehouses.

The network 230 is configured to enable exchange of electronic communications between devices connected to the network 230. For example, the network 230 may be configured to enable exchange of electronic communications between the subscription server 210 and the multiple user systems 240 and 250. The network 230 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (DSL)), radio, television, cable, satellite, or any other delivery or tunneling mechanism for carrying data. Network 230 may include multiple networks or subnetworks, each of which may include, for example, a wired or wireless data pathway. The network 230 may include a circuit-switched network, a packet-switched data network, or any other network able to carry electronic communications. For example, the network 230 may include networks based on the Internet protocol (IP) or asynchronous transfer mode (ATM).

The multiple user systems 240 and 250 each may be a general-purpose computer (e.g., a desktop personal computer, a workstation, or a laptop computer) that is configured to communicate with the subscription server 210 over the network 230. In some implementations, the multiple user systems 240 and 250 may be mobile or wireless devices or devices designed for a specific function. For example, the multiple user systems 240 and 250 may include a cell phone, a smart phone, a tablet PC, a personal digital assistant ("PDA"), or any other portable device configured to communicate over a network and display information. Although FIG. 2 illustrates two user systems for brevity, actual implementations may include more (and, perhaps, many more) user systems.

Figure 3:
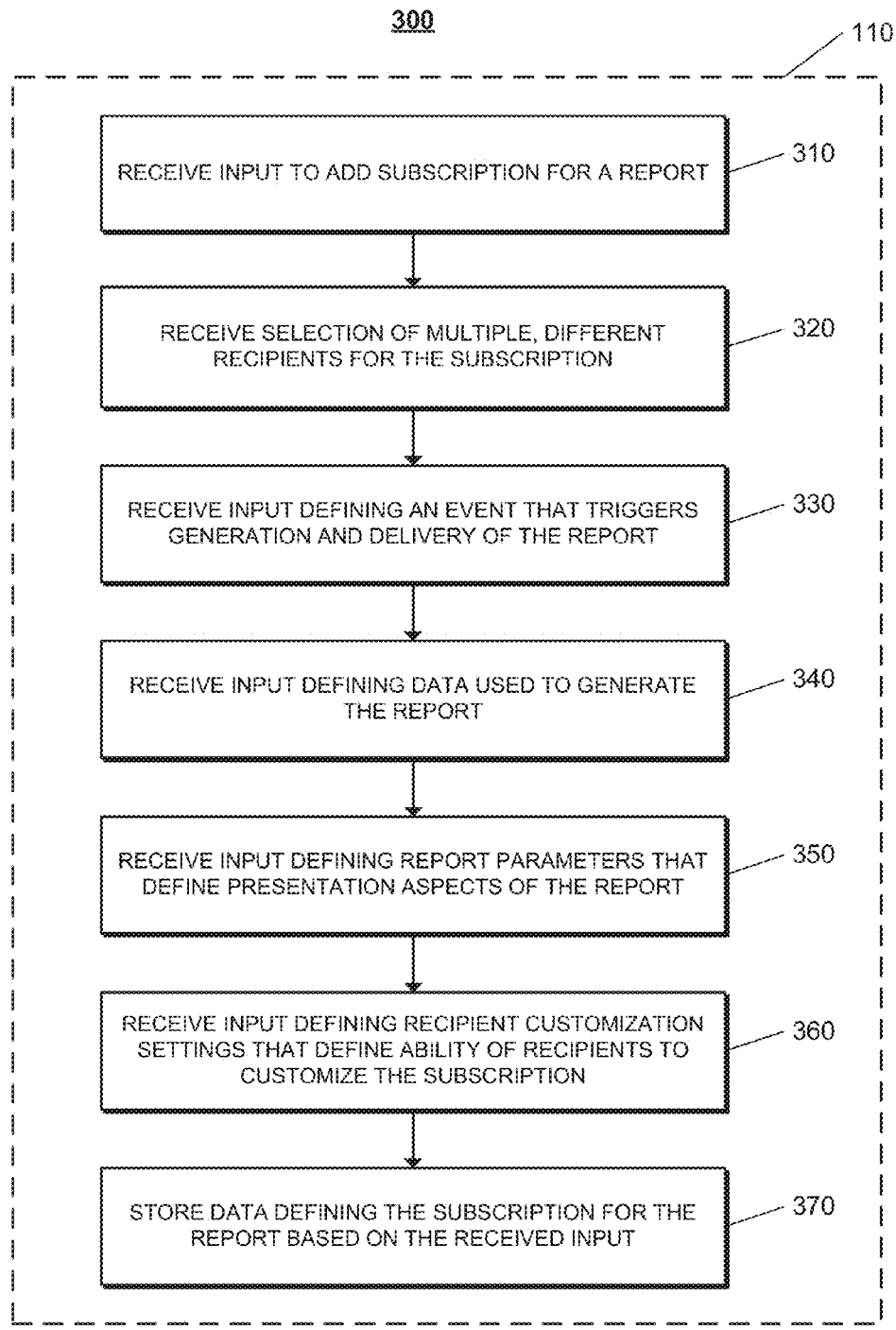

FIG. 3 illustrates an example process 300 for defining a subscription for a report. The process 300 may be used in defining a subscription for a report that is delivered to multiple, different recipients in response to occurrence of an event referenced above with respect to reference numeral 110. The operations of the process 300 are described generally as being performed by the system 200. The operations of the process 300 may be performed one of the components of the system 200 or may be performed by a combination of the components of the system 200. In some implementations, operations of the process 300 may be performed by one or more processors included in one or more electronic devices.

The system 200 receives input to add a subscription for a report (310). For example, the system 200 receives a user input command from a report designer to add a new subscription for a report. In this example, the system 200 may display the interface 400 described below with respect to FIG. 4 and receive selection of an add subscription control displayed in the interface 400.

The system 200 receives selection of multiple, different recipients for the subscription (320). For instance, the system 200 receives user input from a report designer to identify multiple, different recipients that are to receive the subscription. The user input may include data defining a communication address of a recipient and/or may include selection of a contact included in a list of contacts accessible to the report designer. The system 200 may display the interface 500 or the interface 600 described below with respect to FIGS. 5 and 6, respectively, and receive selection of multiple, different contacts or contact groups displayed in the interface 500 or the interface 600.

The system 200 receives input defining an event that triggers generation and delivery of the report (330). For instance, the system 200 receives user input from a report designer to identify an event that triggers the generation and delivery of the report. The event may include a recurring schedule at which report generation and delivery occurs or may define a change (e.g., a change in data stored in a database) that triggers report generation and delivery. The system 200 may monitor for occurrence of the event and, when the event is detected based on the monitoring, the system 200 may trigger report generation and delivery. The system 200 may display the interface 700 described below with respect to FIG. 7 and receive selection of a schedule option included in the schedule list control 710 to define the event that triggers generation and delivery of the report.

The system 200 receives input defining data used to generate the report (340). For example, the system 200 receives user input from a report designer to identify which data to include in the report. In this example, the system 200 may receive input defining a query (e.g., an SQL query) that is executed to gather the information needed to generate the report. In the example shown in FIG. 7, the data used to define the report includes inventory data for inventory received from suppliers by quarter.

The system 200 receives input defining report parameters that define presentation aspects of the report (350). The system 200 may receive report parameters that define how the report should be arranged and how the report should be formatted. The system 200 may display the interface 700 described below with respect to FIG. 7 and receive selection of various options that define presentation aspects of the report from the interface 700.

The system 200 receives input defining recipient customization settings that define ability of recipients to customize the subscription (360). The system 200 receives user input from a report designer to define recipient customization settings that control whether or not recipients are permitted to customize attributes of the subscription at all. If recipients are allowed to customize attributes of the subscription, the recipient customization settings may define which attributes the recipients are allowed to customize. For instance, the recipient customization settings may indicate that recipients are allowed to customize the report parameters that define presentation aspects of the report, but not allowed customize the definition of data used to generate the report or the event that triggers generation and delivery of the report. In some implementations, the recipient customization settings may allow recipients to customize all attributes of the subscription or any subset of the attributes of the subscription. Certain recipients may be given greater ability to customize a subscription than other recipients.

The system 200 stores data defining the subscription for the report based on the received input (370). For example, the system 200 stores, in electronic storage, a subscription record that includes the received user input and defines parameters of when the report should be generated and how the report should be presented to recipients of the subscription. In this example, the system 200 may use the subscription record to control report generation and delivery for the subscription.

FIG. 8, which is described below, shows an example of subscription data 800 that may be stored by the system 200 in electronic storage.

FIG. 4 illustrates an example interface 400 that allows a user to add a subscription. The system 200 may display the interface 400 and receive user input selecting a type of subscription to add. For instance, the system 200 may receive user selection of the add email subscription control 410 and initiate a process to add an email subscription based on the received selection of the add email subscription control 410.

Figure 5:
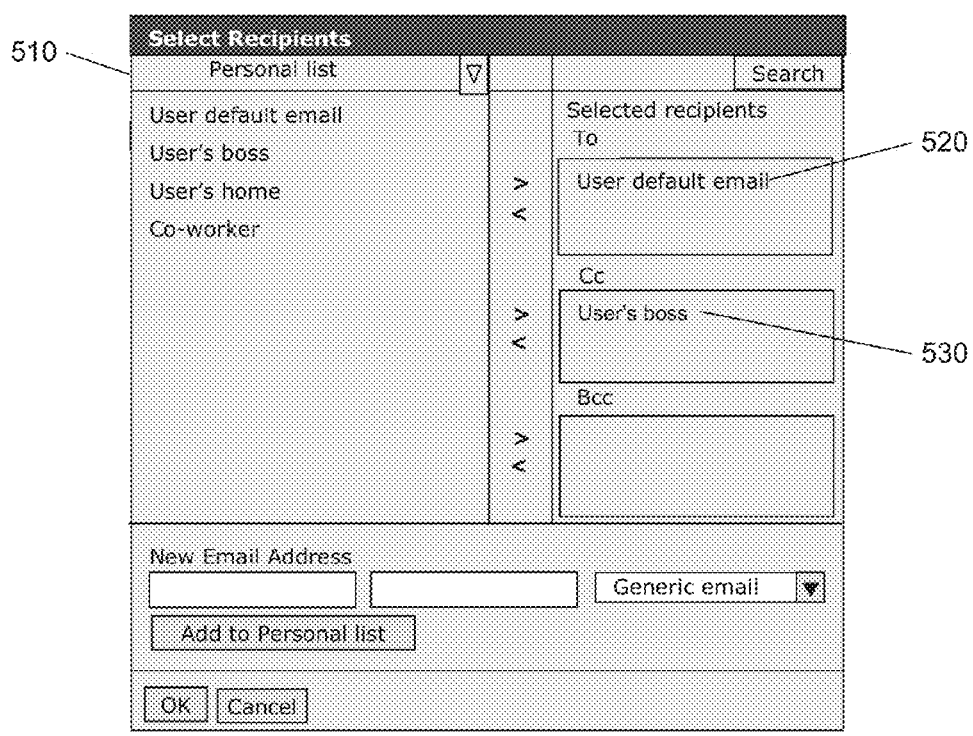

FIG. 5 illustrates an example interface 500 that allows a user to select recipients for a subscription. The system 200 may display the interface 500 in response to user selection of the add email subscription control 410 in the interface 400. The interface 500 includes a personal contact list 510 that lists personal contacts for the user adding the subscription. The system 200 receives input commands selecting which users included in the personal contact list 510 to add to the subscription and whether to add the selected users as 'to,' 'cc,' or 'bcc' recipients. For example, as shown, the user default email contact 520 has been selected as a 'to' recipient and the user's boss contact 530 has been selected as a 'cc' recipient. The system 200 defines the subscription based on the selected recipients. In doing so, the system 200 determines the email addresses associated with the selected recipients and stores the determined email addresses as part of the subscription, even though the user defining the subscription did not provide input defining the email addresses.

Figure 6:
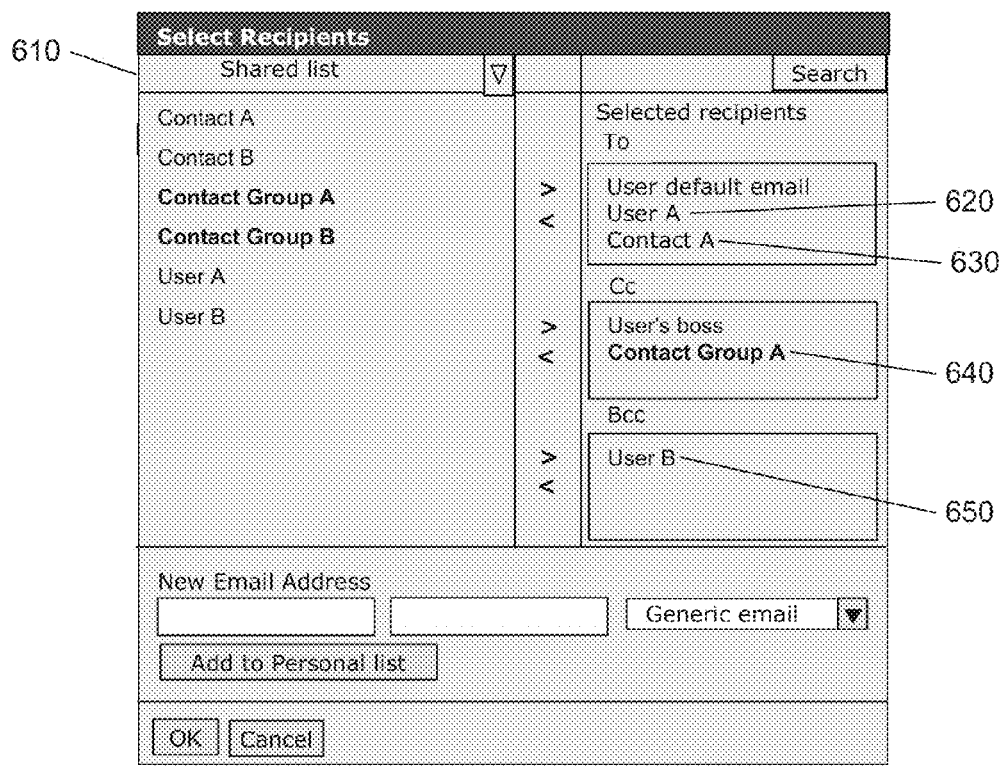

FIG. 6 illustrates an example interface 600 that allows a user to select recipients for a subscription. The system 200 may display the interface 600 in response to user selection of a control which changes the contact list shown in selecting recipients. The interface 600 includes a shared contact list 610 that lists shared contacts for the user adding the subscription. The shared contacts may include individual users and contact groups of user. The shared contacts may be shared by members of an organization, such as employees of a company. The system 200 receives input commands selecting which users included in the shared contact list 610 to add to the subscription and whether to add the selected users as 'to,' 'cc,' or 'bcc' recipients. For example, as shown, the user A contact 620 and the contact A contact 630 have been selected as 'to' recipients. The contact group A contact 640 has been selected as a 'cc' recipient and the user B contact 650 has been selected as a 'bcc' recipient. Based on the selection of the contact group A contact 640, the system 200 defines the subscription to include all users organized in contact group A. The system 200 may define the subscription to dynamically determine the users of contact group A at the time of report generation such that changes to contact group A are reflected in reports delivered based on the subscription without having to change the definition of the subscription. The system 200 defines the subscription based on the selected recipients. In doing so, the system 200 determines the email addresses associated with the selected recipients and stores the determined email addresses as part of the subscription, even though the user defining the subscription did not provide input defining the email addresses.

Figure 7:
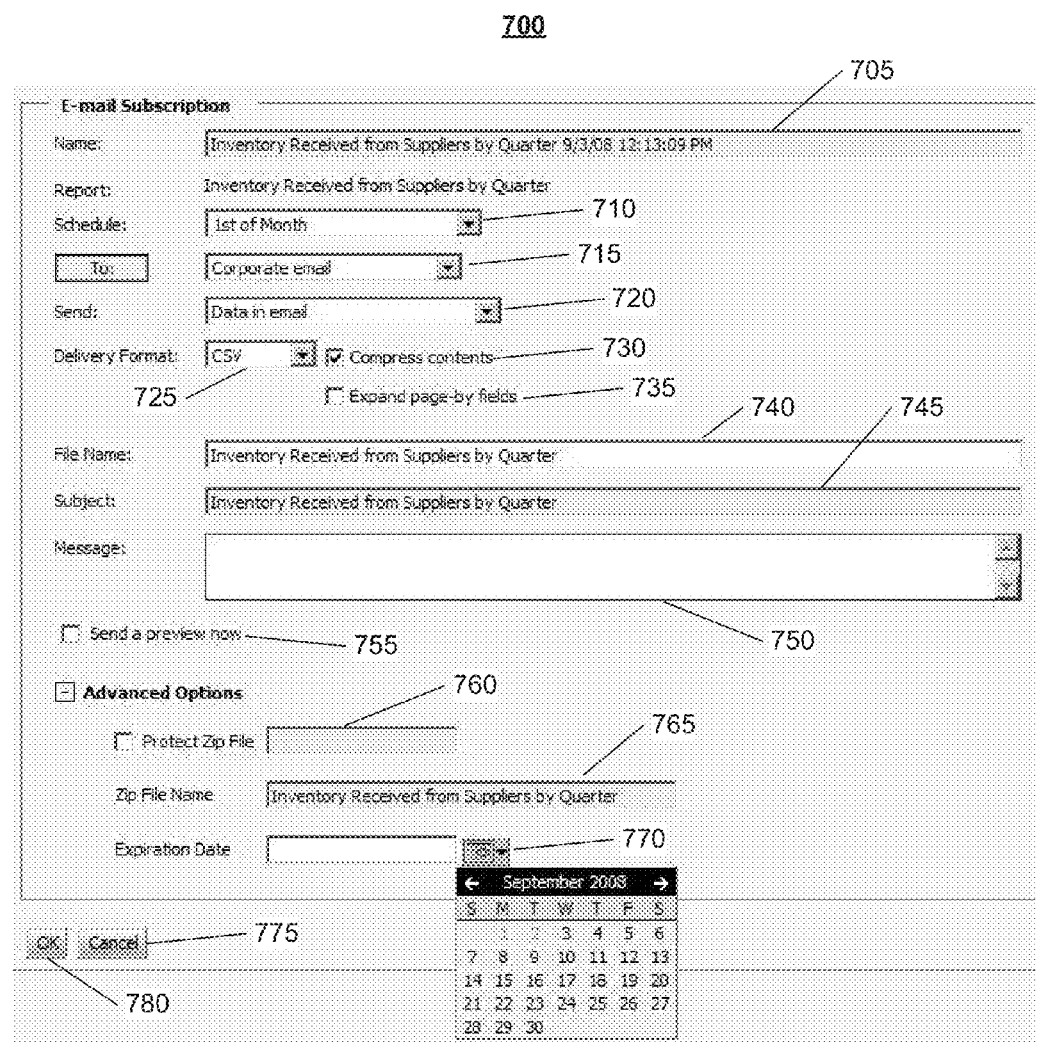

FIG. 7 illustrates an example interface 700 that allows a user to enter data that defines a subscription. The system 200 may display the interface 700 in response to user selection of the add email subscription control 410 in the interface 400. The interface 700 includes a name input field 705, a schedule list control 710, a to list control 715, a send list control 720, a delivery format list control 725, a compress contents selection box 730, an expand page-by fields selection box 735, a file name input field 740, a subject input field 745, a message input field 750, a send preview selection box 755, a protect zip file input field 760, a zip file name input field 765, an expiration date input control 770, a cancel input control 775, and an accept input control 780. In the name input field 705, the system 200 receives text data defining a name for the subscription.

The schedule list control 710 enables a user to select one of multiple schedule options defined in a list. The multiple schedule options each define a schedule at which the report is to be generated and delivered. The multiple schedule options may include a specific time option, an at close of business (weekdays) option, a books closed option, a first of the month option, a Monday morning option, and an on database load option.

The to list control 715 enables a user to select recipients of the report and a device or communication address at which to deliver the report. The send list control 720 enables a user to select an option of how the report should be delivered to recipients. The options in the send list control 720 may include a data in email option, a data in email and link to history list option, a data and link to history list in email option, and a link to history list in email option. The delivery format list control 725 enables a user to select an option of how the report should be formatted. The options in the delivery format list control 725 may include a PDF format option, an Excel format option, a plain text format option, an HTML format option, a comma-separated values (CSV) format option, and a Flash format option.

The compress contents selection box 730 enables a user to indicate whether or not the contents of the report should be compressed. The expand page-by fields selection box 735 enables a user to indicate whether or not page-by fields associated with the report should be expanded.

In the file name input field 740, the system 200 receives text data defining a file name for the report associated with the subscription. In the subject input field 745, the system 200 receives text data defining a subject to include in an email message delivering the report associated with the subscription. In the message input field 750, the system 200 receives text data defining a message (e.g., a body) to include in an email message delivering the report associated with the subscription.

The send preview selection box 755 enables a user to indicate whether or not a preview of the report should be sent. When the preview selection box 755 is selected, a preview is sent to the report designer (not the recipients) to enable the designer to preview the report to determine whether the report is sufficient or changes are needed. In some implementations, the preview may be sent to all recipients.

The protect zip file input field 760 enables a user to indicate whether or not a zip file of the report should be protected and, if so, receives text data defining a password for the zip file. In the zip file name input field 765, the system 200 receives text data defining a name for the zip file associated with the subscription. The expiration date input control 770 enables a user to define a date when the subscription expires.

The cancel input control 775 enables the user to cancel generation of the subscription such that a new subscription is not generated using the information entered in the interface 700. The accept input control 780 enables the user to accept generation of the subscription such that a new subscription is generated using the information entered in the interface 700.

FIG. 8 illustrates an example interface showing subscription data 800 (e.g., a list of subscriptions or subscription records). The subscription data 800 includes a history list portion 810, an email portion 820, a file portion 830, and a print portion 840. The history list portion 810 includes data defining subscriptions that are made available through a history list. The email portion 820 includes data defining subscriptions that are made available through email. The file portion 830 includes data defining subscriptions that are made available through an electronic file. The print portion 840 includes data defining subscriptions that are made available through a printed document (e.g., a hard copy).

The subscription data 800 includes multiple fields for each defined subscription. For example, the subscription data 800 includes a name field 850 that stores a name of a subscription and an owner field 851 that stores a name of an owner (e.g., a report designer) of the subscription. The system 200 may provide the owner defined in the owner field 851 with greater control in defining and changing parameters of the subscription.

The subscription data 800 also includes a schedule field 852 that stores data defining a schedule of when the report associated with the subscription should be generated and delivered. Further, the subscription data 800 includes a recipient field 853 that stores data defining one or more recipients of the subscription.

In addition, the subscription data 800 includes a personalized field 854 that stores data indicating whether or not the subscription has been personalized. When the personalized field 854 indicates that the subscription has been personalized, the system 200 performs operations related to personalizing the report based on preferences of the recipients of the subscription. When the personalized field 854 indicates that the subscription has not been personalized, the system 200 generates and delivers the report based on the subscription without performing operations related to personalizing the report based on preferences of the recipients of the subscription.

The action field 855 includes controls that enable a recipient of the subscription to personalize the subscription and that enable a designer of the subscription to edit the subscription. For instance, for subscriptions that recipients are allowed to personalize, the action field 855 includes a personalize control that may be selected by a recipient of the subscription to define personalization settings for the subscription. The personalization settings for the subscription may be specific to the recipient that defined the personalization settings for the subscription. The action field 855 also may include an edit control that may be selected by an owner or designer of the subscription to edit settings for the subscription. The edited settings may be applied for all recipients of the subscription.

The subscription data 800 includes an unsubscribe field 856 that enables a recipient to unsubscribe to a subscription. For instance, when a recipient no longer wishes to receive a report associated with a subscription, the recipient may check the box in the unsubscribe field 856 to unsubscribe or be removed as recipient of the subscription.

Figure 9:
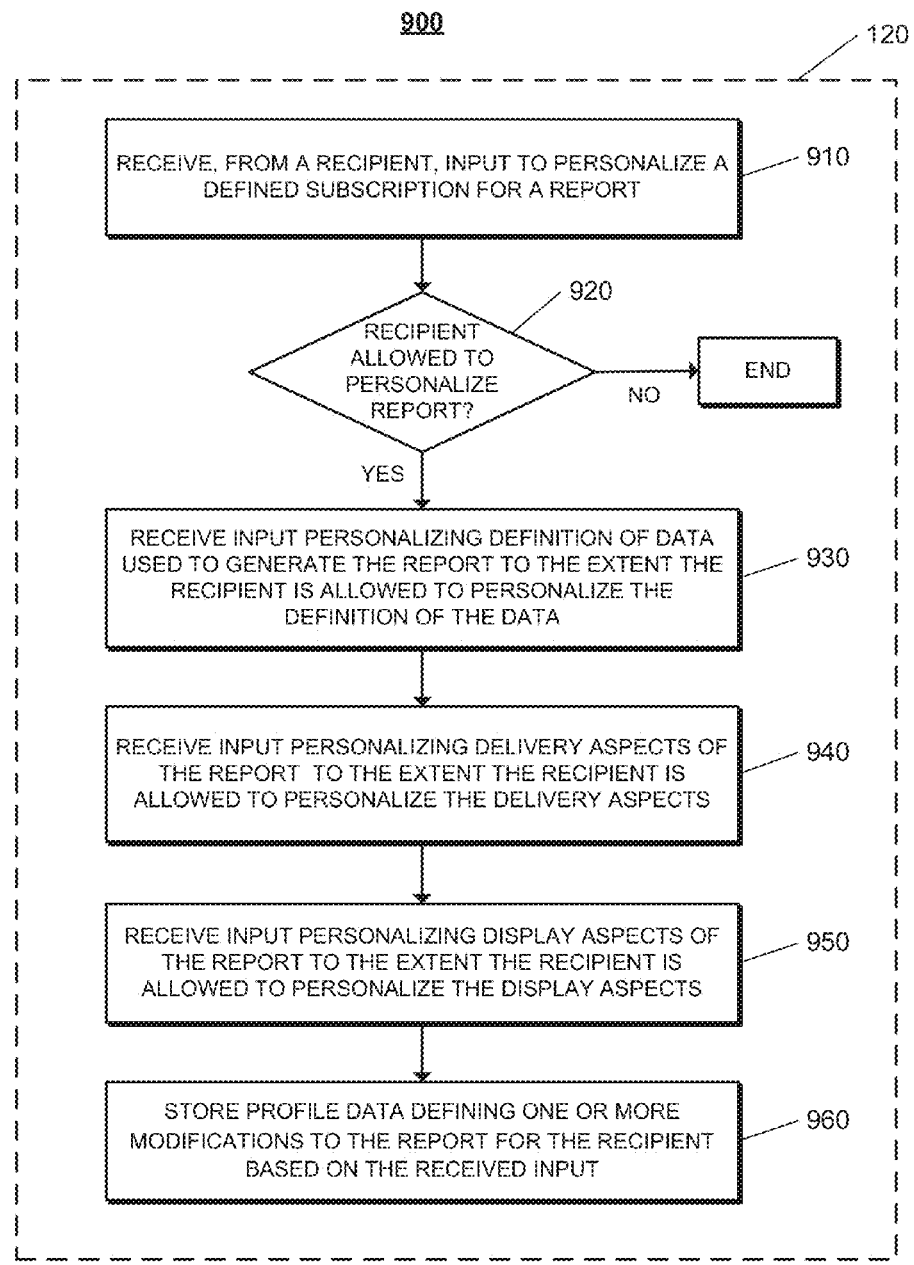

FIG. 9 illustrates an example process 900 for defining profile data. The process 900 may be used in identifying, for a subscription, profile data that is associated with at least one of the multiple, different recipients referenced above with respect to reference numeral 120. The operations of the process 900 are described generally as being performed by the system 200. The operations of the process 900 may be performed one of the components of the system 200 or may be performed by a combination of the components of the system 200. In some implementations, operations of the process 900 may be performed by one or more processors included in one or more electronic devices.

The system 200 receives, from a recipient, input to personalize a defined subscription for a report (910). For example, the system 200 receives a user input command from a recipient of a subscription to personalize the subscription. In this example, the system 200 may display the interface 1000 described below with respect to FIG. 10 and receive selection of a personalize control displayed in the action field 1070 of the interface 1000.

The system 200 determines whether the recipient is allowed to personalize the defined subscription for the report (920). For instance, the system 200 accesses, for the subscription, recipient customization settings that control whether or not recipients are permitted to customize attributes of the subscription. The system 200 compares attributes of the recipient attempting to personalize the report with the accessed recipient customization settings. Based on the comparison, the system 200 determines whether the recipient is allowed to personalize the defined subscription at all and, if so, which aspects of the report the recipient is allowed to personalize.

In response to a determination that the recipient is not allowed to personalize the defined subscription for the report, the process 900 ends. For instance, the defined subscription for the report is used for the recipient without customization or modification. The system 200 may display an interface that indicates to the recipient that personalization of the defined subscription for the report is not allowed.

In response to a determination that the recipient is allowed to personalize the defined subscription for the report, the system 200 receives input personalizing definition of data used to generate the report to the extent the recipient is allowed to personalize the definition of the data (930). For instance, the system 200 determines whether the recipient is allowed to personalize the definition of data based on the comparison of attributes of the recipient attempting to personalize the report with the accessed recipient customization settings. When the recipient is allowed to personalize the definition of data, the system 200 receives user input from the recipient to define one or more modifications of the data to include in the report. In this example, the system 200 may receive input modifying a query (e.g., an SQL query) that is executed to gather the information needed to generate the report. In some implementations, the system 200 may display the interface 1200 described below with respect to FIG. 12 and receive input from the recipient selecting which regions of data the recipient is interested in having in the report.

The system 200 receives input personalizing delivery aspects of the report to the extent the recipient is allowed to personalize the delivery aspects (940). For instance, the system 200 determines whether the recipient is allowed to personalize the delivery aspects of the report and, if so, which delivery aspects based on the comparison of attributes of the recipient attempting to personalize the report with the accessed recipient customization settings. For delivery aspects of the report that the recipient is allowed to personalize, the system 200 receives user input from the recipient to define one or more modifications of the delivery aspects of the report. The system 200 may allow the recipient to personalize a communication medium (e.g., email, link to history list, printed report, etc.) by which the recipient receives the report. The system 200 also may allow the recipient to personalize an event that triggers generation and delivery of the report for the recipient (e.g., change the schedule at which the report is generated and delivered). In some implementations, the system 200 may display the interface 1100 described below with respect to FIG. 11 and receive input from the recipient selecting modifications to delivery aspects that the user is allowed to personalize.

The system 200 receives input personalizing display aspects of the report to the extent the recipient is allowed to personalize the display aspects (950). For example, the system 200 determines whether the recipient is allowed to personalize the display aspects of the report and, if so, which display aspects based on the comparison of attributes of the recipient attempting to personalize the report with the accessed recipient customization settings. For display aspects of the report that the recipient is allowed to personalize, the system 200 receives user input from the recipient to define one or more modifications of the display aspects of the report. The system 200 may allow the recipient to personalize a color, theme, style, layout, and any other visual aspects of the report. The system 200 also may allow the recipient to personalize a type of visual aid to use in representing the defined data in the report, such as a combination of one or more of a bar graph, a pie chart, a line graph, etc.

The system 200 stores, in electronic storage, profile data defining one or more modifications to the report for the recipient based on the received input (960). For example, the system 200 stores, in electronic storage, a personalization record or profile that includes the received user input and defines modifications to when the report should be generated and how the report should be presented to the recipient that personalized the report. In this example, the system 200 may store data associating the personalization record or profile for the subscription with the recipient. Based on the data associating the personalization record or profile for the subscription with the recipient, the system 200 controls personalized report generation and delivery for the subscription for the recipient.

FIG. 10 illustrates an example interface 1000 showing a list of subscriptions for a recipient. The interface 1000 includes a history list portion, an email portion, a file portion, and a print portion. The history list portion includes data defining subscriptions that are made available through a history list. The email portion includes data defining subscriptions that are made available through email. The file portion includes data defining subscriptions that are made available through an electronic file. The print portion includes data defining subscriptions that are made available through a printed document (e.g., a hard copy).

The interface 1000 includes multiple fields for each defined subscription. For example, the interface 1000 includes a name field 1010 that stores a name of a subscription, a report/document field 1020 that stores a name of a report/document associated with the subscription, and an owner field 1030 that stores a name of an owner (e.g., a report designer) of the subscription. The interface 1000 also includes a schedule field 1040 that stores data defining a schedule of when the report associated with the subscription should be generated and delivered. Further, the interface 1000 includes a recipient field 1050 that stores data defining one or more recipients of the subscription. The recipient field 1050 indicates that "User" is a recipient of the subscription or a group to which the "User" belongs is a recipient of the subscription.

In addition, the interface 1000 includes a personalized field 1060 that stores data indicating whether or not the "User" has personalized the subscription. The action field 1070 includes controls that enable the "User" to personalize the subscription. The interface 1000 further includes an unsubscribe field 1080 that enables the "User" to unsubscribe to a subscription if the "User" is permitted to unsubscribe to the subscription.

FIG. 11 illustrates an example interface 1100 that allows a recipient to enter data that customizes a subscription. The interface 1100 includes a name field 1105 that displays a name of the subscription, a report field 1110 that displays a report associated with the subscription, and a schedule field 1115 that displays a schedule defining when the report is generated and delivered. In the example shown in FIG. 11, the name field 1105, the report field 1110, and the schedule field 1115 are not customizable by the recipient and, therefore, are not displayed with an interface control that allows customization. In other implementations, one or more of the name field 1105, the report field 1110, and the schedule field 1115 are customizable and are displayed with an interface control that allows customization.

The interface 1100 also includes a to field 1120 and a send field 1125. The to field 1120 enables the recipient to modify an email address for the recipient of the report, so that the recipient can define an email address at which the recipient prefers to receive the report. The send field 1125 enables the recipient to modify an option of how the report should be delivered to the recipient. The options in the send field 1125 may include a data in email option, a data in email and link to history list option, a data and link to history list in email option, and a link to history list in email option.

The interface 1100 further includes a delivery format field 1130 that displays how the report is formatted. In the example shown in FIG. 11, the delivery format field 1130 is not customizable by the recipient and, therefore, is not displayed with an interface control that allows customization. In other implementations, the delivery format field 1130 is customizable. The options in the delivery format field 1130 may include a PDF format option, an Excel format option, a plain text format option, an HTML format option, a comma-separated values (CSV) format option, and a Flash format option. The compress selection box enables the recipient to indicate whether or not the contents of the report should be compressed.

In the subject field 1135, the system 200 receives text data modifying a subject included in an email message delivering the report associated with the subscription to the recipient. In the message input field 1140, the system 200 receives text data modifying a message (e.g., a body) to include in an email message delivering the report associated with the subscription to the recipient.

The send preview selection box 1145 enables the recipient to indicate whether or not a preview of the customized report should be sent. When the preview selection box 1145 is selected, a preview is sent to the recipient (not the report designer or other recipients) to enable the recipient to preview the customized report to determine whether the customized report is sufficient or additional changes are needed. The protect zip file field 1150 enables the recipient to indicate whether or not a zip file of the report should be protected and, if so, receives text data defining a password for the zip file. In the zip file name field 1155, the system 200 receives text data defining a name for the zip file associated with the subscription for the recipient. The expiration date input control 1160 enables the recipient to define a date when the customizations for the subscription expire.

The ok input control 1165 enables the recipient to accept customizations of the subscription such that subscription profile data for the recipient is generated using the information entered in the interface 1100. The cancel input control 1170 enables the recipient to cancel customizations of the subscription such that subscription profile data for the recipient is not generated using the customization information entered in the interface 1100.

Figure 12:
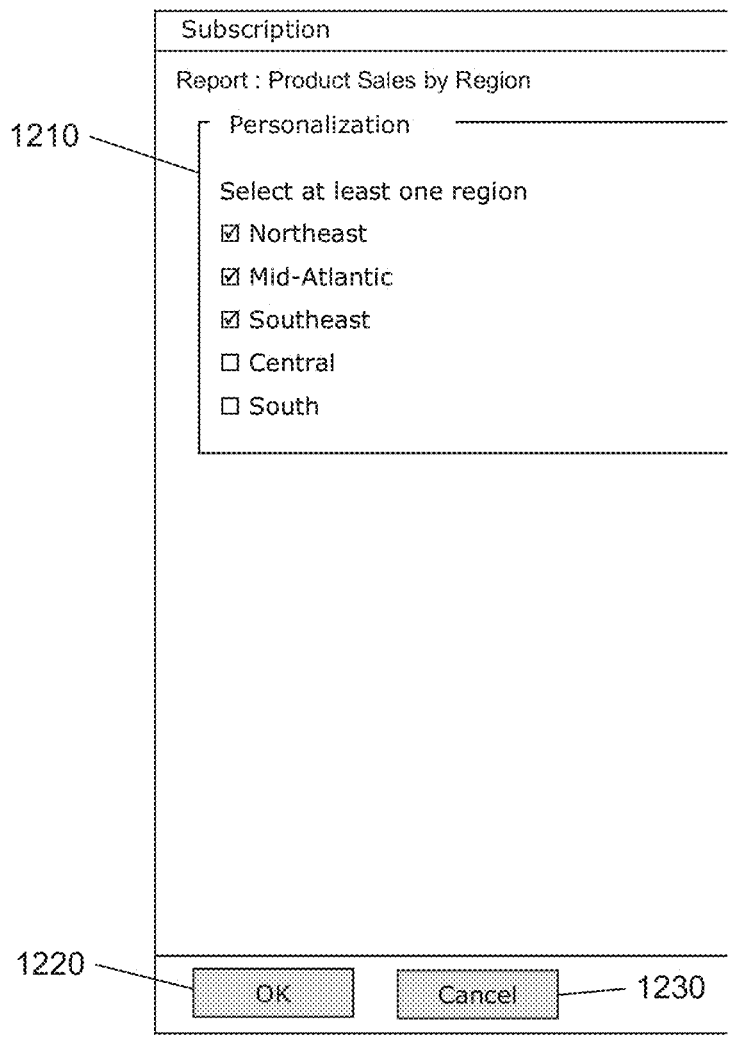

FIG. 12 illustrates an example interface 1200 that allows a recipient to enter data that customizes a subscription. As shown, the interface 1200 includes a region personalization area 1210 that allows a recipient to select one or more regions. The system 200 may personalize a report for the recipient based on the one or more regions selected in the region personalization area 1210. For instance, the system 200 may define the data included in the report for the recipient based on the selected regions and also may display presentation aspects of the report for the recipient based on the selected regions. In the example shown in FIG. 12, the recipient has selected the northeast, mid-atlantic, and southeast regions, so the system 200 generates the report for the recipient using data for the northeast, mid-atlantic, and southeast regions while excluding data for the central and south regions. The system 200 may generate reports for other recipients using a different combination of regions available for selection.

The ok input control 1220 enables the recipient to accept customizations of the subscription such that subscription profile data for the recipient is generated using the information entered in the interface 1200. The cancel input control 1230 enables the recipient to cancel customizations of the subscription such that subscription profile data for the recipient is not generated using the customization information entered in the interface 1200.

Figure 13:
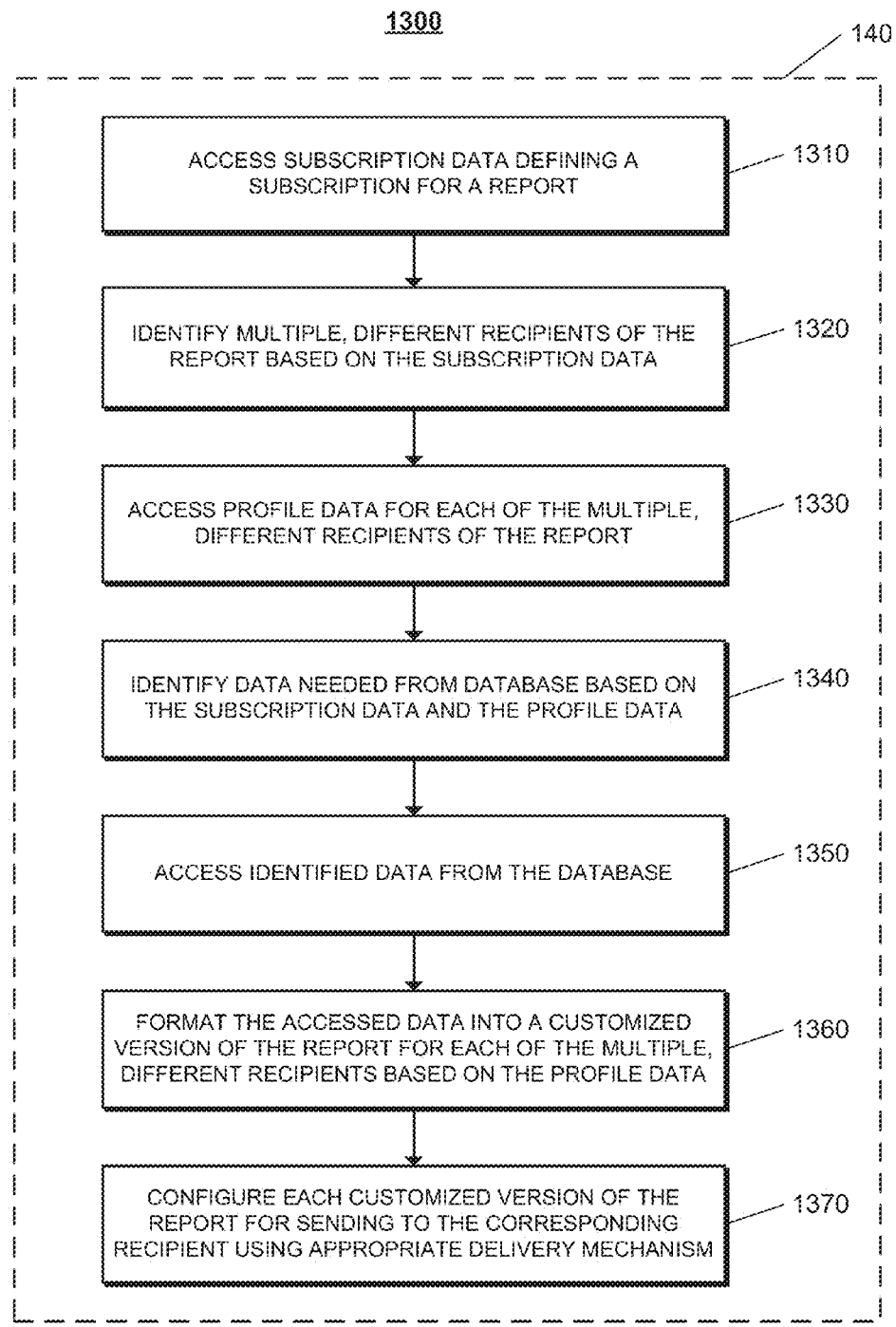

FIG. 13 illustrates an example process 1300 for defining profile data. The process 1300 may be used in generating customized versions of a report referenced above with respect to reference numeral 140. The operations of the process 1300 are described generally as being performed by the system 200. The operations of the process 1300 may be performed one of the components of the system 200 or may be performed by a combination of the components of the system 200. In some implementations, operations of the process 1300 may be performed by one or more processors included in one or more electronic devices.

The system 200 accesses subscription data defining a subscription for a report (1310). For instance, the system 200 accesses subscription data defined by a report designer from electronic storage in response to detecting an event that triggers generation and delivery of the report associated with the subscription. The system 200 may access subscription data defined using the process 300 described above with respect to FIG. 3.

The system 200 identifies multiple, different recipients of the report based on the subscription data (1320). For example, the system 200 analyzes the subscription data to identify an address or a user identifier for multiple, different recipients of the report. In this example, the system 200 may access the address or the user identifier for multiple, different recipients from a recipient field included in the subscription data.

The system 200 accesses profile data for each of the multiple, different recipients of the report (1330). For instance, the system 200 accesses profile data defined by a recipient from electronic storage. The system 200 may access a personal profile for each of the multiple, different recipients of the report that defines personalization of the report. The personal profile may be a general profile that defines general report preferences for the corresponding recipient that apply to all reports. The general profile may be pre-set by the recipient prior to the subscription being generated. The personal profile also may be a subscription-specific profile that defines report preferences for the corresponding recipient that apply only to the relevant subscription. The subscription-specific profile may be defined by the recipient after the subscription has been generated.

In some examples, the system 200 may access a security profile for each of the multiple, different recipients of the report that defines data access rights for data stored in the database. In these examples, the security profile may be defined by a system administrator and may define data access rights for the corresponding recipient. The data access rights may be used to control which data is included in the report sent to the corresponding recipient.

The system 200 identifies data needed from a database based on the subscription data and the profile data (1340). For example, the system 200 identifies the data needed to generate the report defined by the subscription. In this example, the system 200 may generate a query that returns the data needed to generate the report.

For a particular recipient that has customized the definition of data for the report, the system 200 identifies data for the report for the particular recipient based on the profile data. The system 200 may modify the data definition based on preferences defined in a personal profile for the particular recipient. For instance, when the particular recipient has selected a region of interest, the system 200 may identify data that corresponds to the region of interest. In addition, when the security profile for the particular recipient limits access to data included in the data definition for the subscription, the system 200 may automatically adjust the data definition for the particular recipient to exclude the data that the particular recipient does not have the right to access.

The system 200 accesses the identified data from the database (1350). For example, the system 200 executes one or more queries against a database to access the data needed to generate the report associated with the subscription. The system 200 also may access the data needed to generate the report associated with the subscription from a cache or a memory that includes, at least temporarily, the data needed to generate the report associated with the subscription.

The system 200 formats the accessed data into a customized version of the report for each of the multiple, different recipients based on the profile data (1360). For instance, the system 200 formats the accessed data into a customized version of the report for each of the multiple, different recipients based on the personal profile data and the security profile data associated with the multiple, different recipients. The system 200 may customize the definition of data used to generate the report and report parameters that define presentation aspects of the report for each of the multiple, different recipients. The system 200 may define a different version of the report for each of the multiple, different recipients such that each recipient receives a report customized to his or her preferences and access rights.

In some examples, the system 200 limits the accessed data included in the customized version of the report for each of the multiple, different recipients to data which the corresponding recipient is able to access according to the security profile of the corresponding recipient. In these examples, in generating a report for a particular, recipient, the system 200 filters, from the accessed data, the data the particular recipient does not have the right to access and generates the report for the particular recipient using the accessed data after filtering.

The system 200 configures each customized version of the report for sending to the corresponding recipient using an appropriate delivery mechanism (1370). For example, the system 200 configures a customized report for sending using a particular communication medium and/or communication address specified by the recipient of the report. The system 200 also configures the format of a report based on format settings specified by the recipient of the report. The system 200 delivers the customized versions of the report using the appropriate delivery mechanism for each of the multiple, different recipients.

Figure 14:
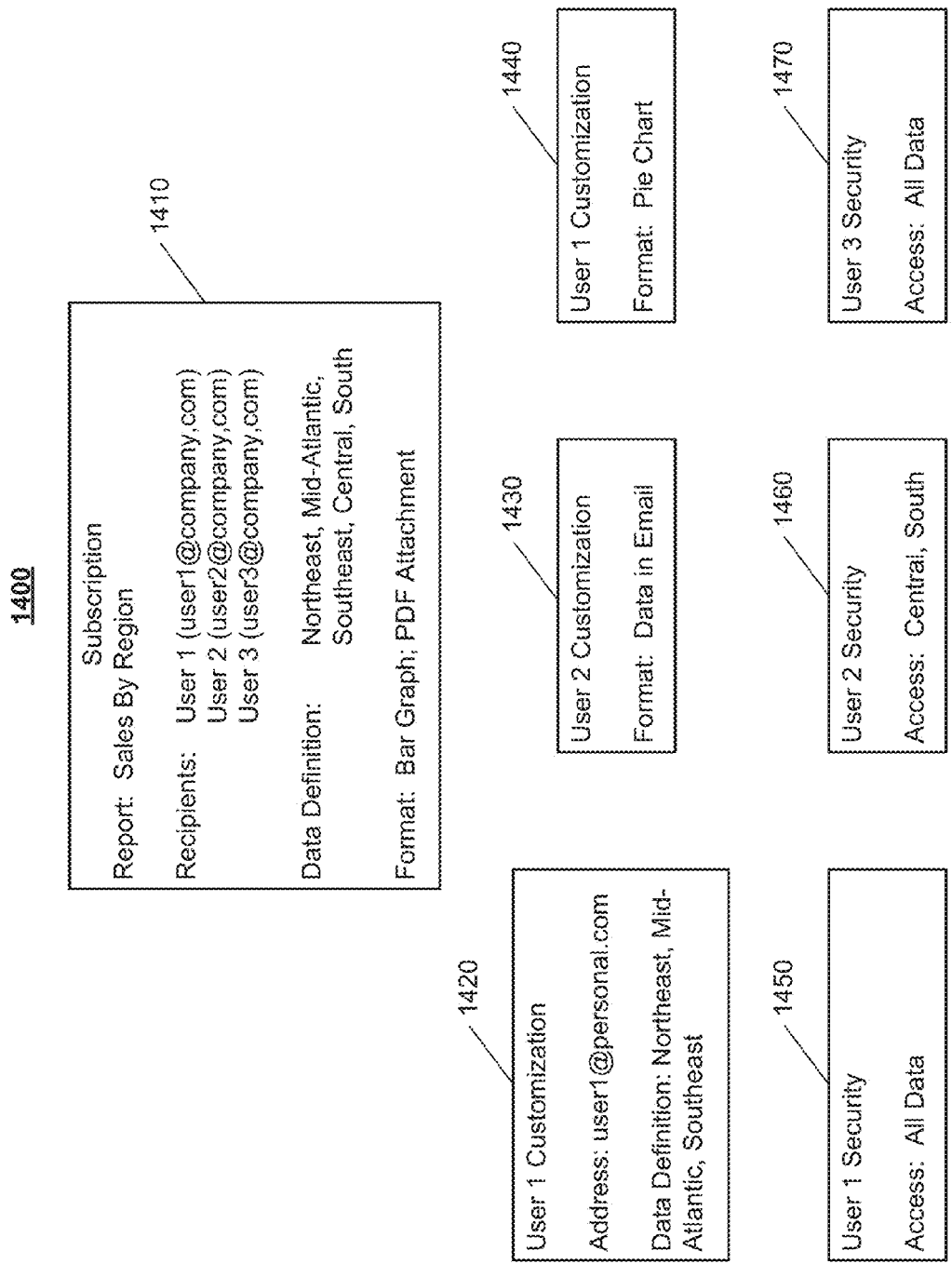
FIG. 14 is a diagram of exemplary subscription and profile data.

FIG. 14 illustrates example data structures 1400 including subscription data and profile data. As shown, the subscription data 1410 defines a report titled Sales By Region with three recipients: User 1, User 2, and User 3. The subscription data 1410 indicates that the definition of data includes data for a Northeast region, a Mid-Atlantic region, a Southeast region, a Central region, and a South region. The subscription data 1410 further defines that the report uses a bar graph format and is delivered as a PDF attachment to an electronic mail message.

Each of the three recipients include a personal profile and a security profile that are used in customizing the subscription defined by the subscription data 1410. For instance, User 1 includes a personal profile 1420 and a security profile 1450. The personal profile 1420 for User 1 indicates that User 1 prefers to receive the report associated with the subscription at an electronic mail address user1@personal.com, rather than an electronic mail address user1@company.com. In addition, the personal profile 1420 for User 1 indicates that User 1 prefers to receive data for the Northeast region, the Mid-Atlantic region, and the Southeast region. The security profile 1450 for User 1 indicates that User 1 is able to access all data and, therefore, does not impact the report generated for User 1.

User 2 includes a personal profile 1430 and a security profile 1460. The personal profile 1430 for User 2 indicates that User 2 prefers to receive the report associated with the subscription formatted as Data in Email, rather than as a PDF attachment. The security profile 1460 for User 2 indicates that User 2 is able to access data for the Central region, and the South region and, therefore, data for the Northeast region, the Mid-Atlantic region, and the Southeast region needs to be excluded for the report generated for User 2.

User 3 includes a personal profile 1440 and a security profile 1470. The personal profile 1440 for User 3 indicates that User 3 prefers to receive the report associated with the subscription formatted as a Pie Chart, rather than as a Bar Graph. The security profile 1470 for User 3 indicates that User 3 is able to access all data and, therefore, does not impact the report generated for User 3.

Figure 15:
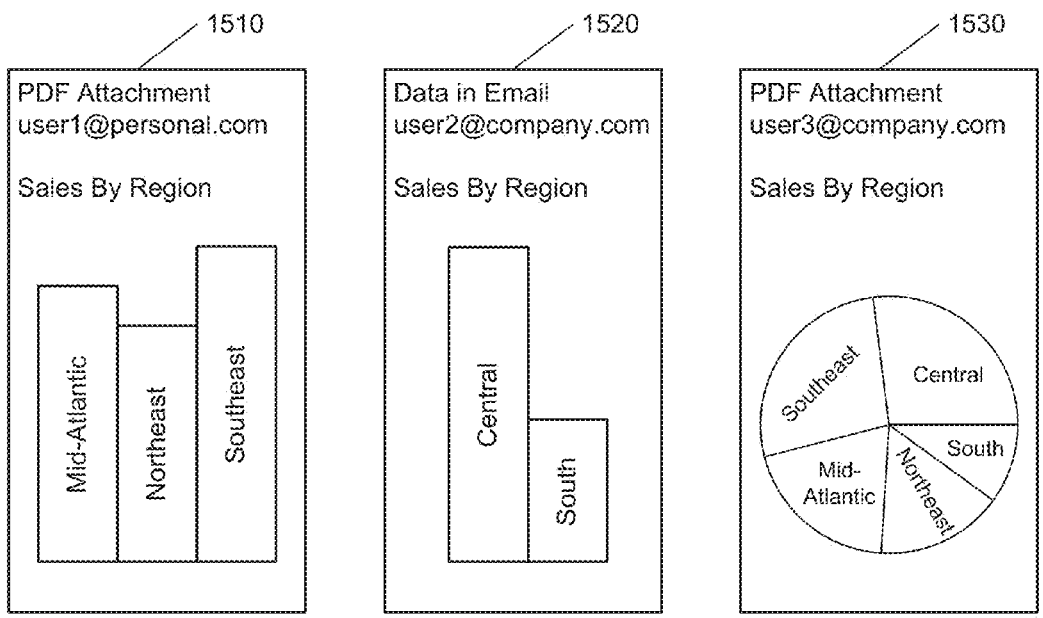
FIG. 15 is a diagram of exemplary reports generated using the subscription and profile data shown in FIG. 14.

FIG. 15 illustrates example reports 1500 generated based on the subscription data and profile data shown in FIG. 14. As shown, the example reports 1500 include a report 1510 for User 1, a report 1520 for User 2, and a report 1530 for User 3. The report 1510 for User 1 was customized based on the personal profile 1420 for User 1. Specifically, based on the personal profile 1420, the report 1510 was sent to the electronic mail address user1@personal.com, rather than an electronic mail address user1@company.com, and the report 1510 includes data for the Northeast region, the Mid-Atlantic region, and the Southeast region, rather than all of the Northeast region, the Mid-Atlantic region, the Southeast region, the Central region, and the South region. Other aspects of the report 1510 were defined based on the subscription data 1410 for the report because the personal profile 1420 for User 1 and the security profile 1450 for User 1 do not define customizations for the other aspects of the report 1510.

The report 1520 for User 2 was customized based on the personal profile 1430 for User 2 and the security profile 1460 for User 2. Specifically, based on the personal profile 1430, the report 1520 was formatted as Data in Email, rather than as a PDF attachment. In addition, based on the security profile 1460, the report 1520 includes data for the Central region and the South region, rather than all of the Northeast region, the Mid-Atlantic region, the Southeast region, the Central region, and the South region. Other aspects of the report 1520 were defined based on the subscription data 1410 for the report because the personal profile 1430 for User 2 and the security profile 1460 for User 2 do not define customizations for the other aspects of the report 1520.

The report 1530 for User 3 was customized based on the personal profile 1440 for User 3. Specifically, based on the personal profile 1440, the report 1530 was formatted as a pie chart, rather than a bar graph. Other aspects of the report 1530 were defined based on the subscription data 1410 for the report because the personal profile 1440 for User 3 and the security profile 1470 for User 3 do not define customizations for the other aspects of the report 1530.

Figure 16:
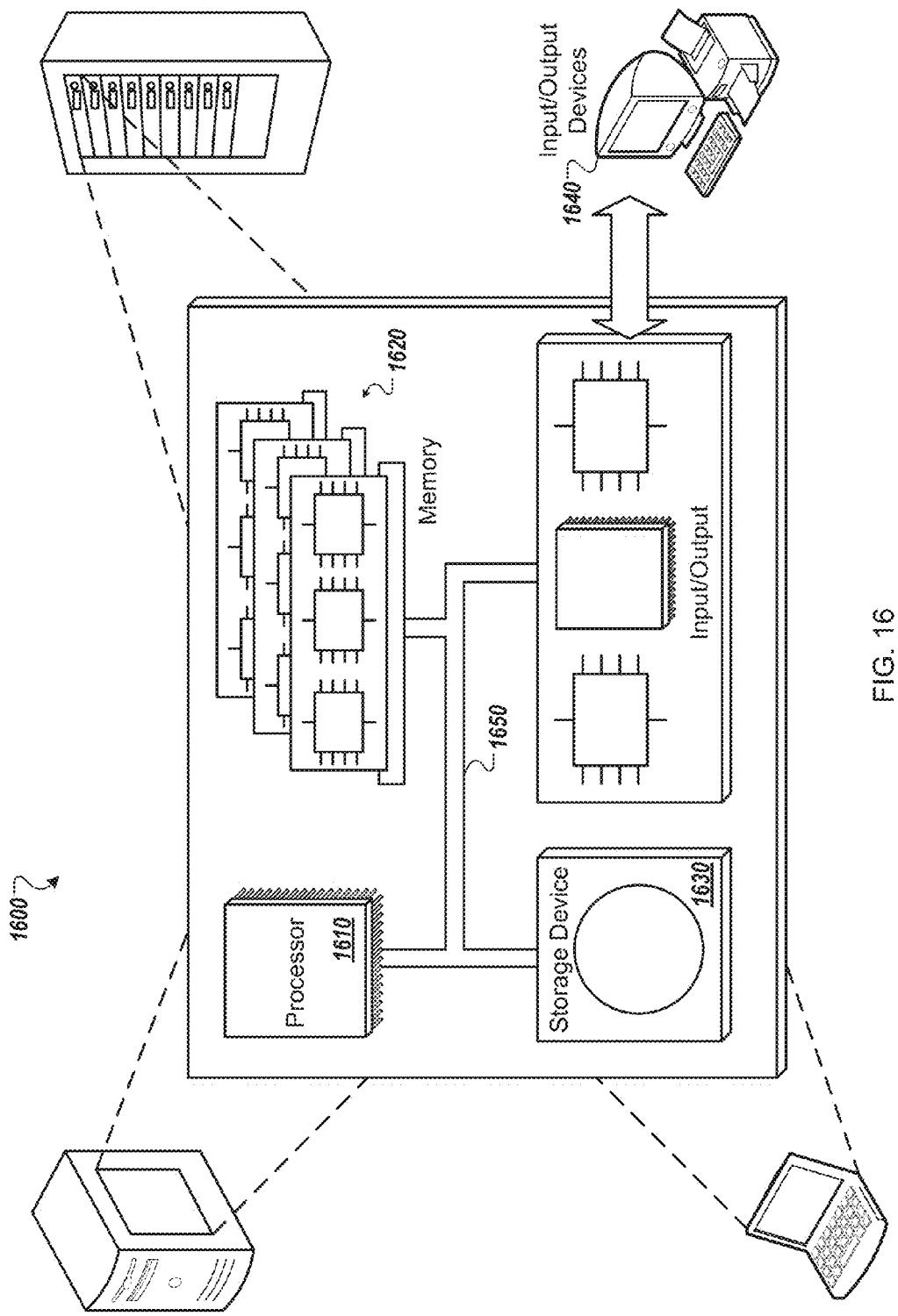

FIG. 16 is a schematic diagram of a generic computer system 1600. The system 1600 can be used for the operations described in association with any of the computer-implemented methods described previously. The system 1600 includes a processor 1610, a memory 1620, a storage device 1630, and an input/output device 1640. Each of the components 1610, 1620, 1630, and 1640 are interconnected using a system bus 1650. The processor 1610 is capable of processing instructions for execution within the system 1600. In one implementation, the processor 1610 is a single-threaded processor. In another implementation, the processor 1610 is a multi-threaded processor. The processor 1610 is capable of processing instructions stored in the memory 1620 or on the storage device 1630 to display graphical information for a user interface on the input/output device 1640.

The memory 1620 stores information within the system 1600. In some implementations, the memory 1620 is a computer-readable storage medium. In another implementation, the memory 1620 is a volatile memory unit. In yet another implementation, the memory 1620 is a non-volatile memory unit.

The storage device 1630 is capable of providing mass storage for the system 1600. In some implementations, the storage device 1630 is a computer-readable storage medium. In various different implementations, the storage device 1630 may be a floppy disk device, a hard disk device, an optical disk device, or a tape device.

The input/output device 1640 provides input/output operations for the system 1600. In one implementation, the input/output device 1640 includes a keyboard and/or pointing device. In another implementation, the input/output device 1640 includes a display unit for displaying graphical user interfaces.

The features described can be implemented in digital electronic circuitry, or in computer hardware, firmware, software, or in combinations of them. An apparatus can be implemented in a computer program product tangibly embodied in a machine-readable storage device, for execution by a programmable processor; and method steps can be performed by a programmable processor executing a program of instructions to perform functions of the described implementations by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and a sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method comprising:
   defining, based on user input provided by an owner, a subscription for a report that is delivered to multiple, different recipients in response to occurrence of an event, the subscription defining the event that triggers generation and delivery of the report, recipient data that enables identification of the multiple, different recipients to which the report is delivered, and definition of data used to generate the report;
   defining, based on user input provided by the owner, recipient customization settings that define ability of the multiple, different recipients to customize the subscription;
   receiving, from a first recipient included in the multiple, different recipients, input attempting to personalize a delivery aspect of the report;
   analyzing the recipient customization settings in response to the attempt to personalize the delivery aspect of the report;
   based on the analysis of the recipient customization settings in response to the attempt to personalize the delivery aspect of the report, determining that the first recipient is allowed to personalize the delivery aspect of the report;

based on the determination that the first recipient is allowed to personalize the delivery aspect of the report, storing delivery data that defines personalization of the delivery aspect of the report by the first recipient;

detecting occurrence of the event that triggers generation and delivery of the report;

in response to detection of the event that triggers generation and delivery of the report, generating a first version of the report for the first recipient based on the definition of the data used to generate the report included in the subscription and the delivery data that defines personalization of the delivery aspect of the report by the first recipient and generating a second version of the report for a second recipient included in the multiple, different recipients based on the definition of the data used to generate the report included in the subscription, the first version of the report being delivered to the first recipient differently than the second version of the report is delivered to the second recipient based on the delivery data that defines personalization of the delivery aspect of the report by the first recipient;

delivering the first version of the report to the first recipient using a first delivery mechanism defined by the delivery data that defines personalization of the delivery aspect of the report by the first recipient; and delivering the second version of the report to the second recipient using a second delivery mechanism that differs from the first delivery mechanism.

2. The method of claim 1, further comprising:

receiving, from the second recipient included in the multiple, different recipients, input attempting to personalize a delivery aspect of the report for the second recipient;

analyzing the recipient customization settings in response to the attempt to personalize the delivery aspect of the report for the second recipient;

based on the analysis of the recipient customization settings in response to the attempt to personalize the delivery aspect of the report for the second recipient, determining that the second recipient is not allowed to personalize the delivery aspect of the report for the second recipient; and based on the determination that the second recipient is not allowed to personalize the delivery aspect of the report for the second recipient, preventing the second recipient from personalizing the delivery aspect of the report for the second recipient.

3. The method of claim 1, wherein the recipient data that enables identification of the multiple, different recipients to which the report is delivered includes recipient data that defines a dynamic recipient list that is generated by querying a table in a database.

4. The method of claim 1, wherein the owner is different than the first and second recipients and has control of the subscription of the report.

5. The method of claim 1, wherein delivering the second version of the report to the second recipient using the second delivery mechanism comprises delivering the second version of the report to the second recipient using a default delivery mechanism defined by the subscription.

6. The method of claim 1:

wherein receiving, from the first recipient included in the multiple, different recipients, input attempting to personalize the delivery aspect of the report comprises receiving, from the first recipient included in the multiple, different recipients, input attempting to select an electronic mail delivery mechanism for the report;

wherein storing delivery data that defines personalization of the delivery aspect of the report by the first recipient comprises storing delivery data that defines the electronic mail delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the electronic mail delivery mechanism.

7. The method of claim 1:

wherein receiving, from the first recipient included in the multiple, different recipients, input attempting to personalize the delivery aspect of the report comprises receiving, from the first recipient included in the multiple, different recipients, input attempting to select a mobile delivery mechanism for the report;

wherein storing delivery data that defines personalization of the delivery aspect of the report by the first recipient comprises storing delivery data that defines the mobile delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the mobile delivery mechanism.

8. The method of claim 1:

wherein receiving, from the first recipient included in the multiple, different recipients, input attempting to personalize the delivery aspect of the report comprises receiving, from the first recipient included in the multiple, different recipients, input attempting to select a print delivery mechanism for the report;

wherein storing delivery data that defines personalization of the delivery aspect of the report by the first recipient comprises storing delivery data that defines the print delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the print delivery mechanism.

9. The method of claim 1:

wherein receiving, from the first recipient included in the multiple, different recipients, input attempting to personalize the delivery aspect of the report comprises receiving, from the first recipient included in the multiple, different recipients, input attempting to select a file delivery mechanism for the report;

wherein storing delivery data that defines personalization of the delivery aspect of the report by the first recipient comprises storing delivery data that defines the file delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the file delivery mechanism.

10. The method of claim 1, wherein generating first and second versions of the report comprises:

accessing subscription data defining a subscription for a report;
identifying multiple, different recipients of the report based on the subscription data;
accessing profile data for each of the multiple, different recipients of the report;
identifying data needed from a database based on the subscription data and the profile data;
accessing the identified data from the database;
formatting the accessed data into a customized version of the report for each of the multiple, different recipients based on the profile data; and
configuring each customized version of the report for sending to the corresponding recipient using an appropriate delivery mechanism for the corresponding recipient.

11. A system comprising:
one or more computers that each include at least one processor; and
a computer-readable medium coupled to the one or more computers having instructions stored thereon which, when executed by the one or more computers, cause the one or more computers to perform operations comprising:
defining, based on user input provided by an owner, a subscription for a report that is delivered to multiple, different recipients in response to occurrence of an event, the subscription defining the event that triggers generation and delivery of the report, recipient data that enables identification of the multiple, different recipients to which the report is delivered, and definition of data used to generate the report;
defining, based on user input provided by the owner, recipient customization settings that define ability of the multiple, different recipients to customize the subscription;
receiving, from a first recipient included in the multiple, different recipients, input attempting to personalize a delivery aspect of the report;
analyzing the recipient customization settings in response to the attempt to personalize the delivery aspect of the report;
based on the analysis of the recipient customization settings in response to the attempt to personalize the delivery aspect of the report, determining that the first recipient is allowed to personalize the delivery aspect of the report;
based on the determination that the first recipient is allowed to personalize the delivery aspect of the report, storing delivery data that defines personalization of the delivery aspect of the report by the first recipient;
detecting occurrence of the event that triggers generation and delivery of the report;
in response to detection of the event that triggers generation and delivery of the report, generating a first version of the report for the first recipient based on the definition of the data used to generate the report included in the subscription and the delivery data that defines personalization of the delivery aspect of the report by the first recipient and generating a second version of the report for a second recipient included in the multiple, different recipients based on the definition of the data used to generate the report included in the subscription, the first version of the report being delivered to the first recipient differently than the second version of the report is delivered to the second recipient based on the delivery data that defines personalization of the delivery aspect of the report by the first recipient;
delivering the first version of the report to the first recipient using a first delivery mechanism defined by the delivery data that defines personalization of the delivery aspect of the report by the first recipient; and
delivering the second version of the report to the second recipient using a second delivery mechanism that differs from the first delivery mechanism.

12. The system of claim 11, wherein the operations further comprise:
receiving, from the second recipient included in the multiple, different recipients, input attempting to personalize a delivery aspect of the report for the second recipient;
analyzing the recipient customization settings in response to the attempt to personalize the delivery aspect of the report for the second recipient;
based on the analysis of the recipient customization settings in response to the attempt to personalize the delivery aspect of the report for the second recipient, determining that the second recipient is not allowed to personalize the delivery aspect of the report for the second recipient; and
based on the determination that the second recipient is not allowed to personalize the delivery aspect of the report for the second recipient, preventing the second recipient from personalizing the delivery aspect of the report for the second recipient.

13. The system of claim 11, wherein the recipient data that enables identification of the multiple, different recipients to which the report is delivered includes recipient data that defines a dynamic recipient list that is generated by querying a table in a database.

14. The system of claim 11, wherein the owner is different than the first and second recipients and has control of the subscription of the report.

15. The system of claim 11, wherein delivering the second version of the report to the second recipient using the second delivery mechanism comprises delivering the second version of the report to the second recipient using a default delivery mechanism defined by the subscription.

16. The system of claim 11:
wherein receiving, from the first recipient included in the multiple, different recipients, input attempting to personalize the delivery aspect of the report comprises receiving, from the first recipient included in the multiple, different recipients, input attempting to select an electronic mail delivery mechanism for the report;
wherein storing delivery data that defines personalization of the delivery aspect of the report by the first recipient comprises storing delivery data that defines the electronic mail delivery mechanism for the first recipient; and
wherein delivering the first version of the report to the first recipient using the first delivery mechanism defined by the delivery data that defines personalization of the delivery aspect of the report by the first recipient comprises delivering the first version of the report to the first recipient using the electronic mail delivery mechanism.

17. The system of claim 11:
wherein receiving, from the first recipient included in the multiple, different recipients, input attempting to personalize the delivery aspect of the report comprises receiving, from the first recipient included in the multiple, different recipients, input attempting to select a mobile delivery mechanism for the report;

wherein storing delivery data that defines personalization of the delivery aspect of the report by the first recipient comprises storing delivery data that defines the mobile delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the mobile delivery mechanism.

18. The system of claim 11:

wherein receiving, from the first recipient included in the multiple, different recipients, input attempting to personalize the delivery aspect of the report comprises receiving, from the first recipient included in the multiple, different recipients, input attempting to select a print delivery mechanism for the report;

wherein storing delivery data that defines personalization of the delivery aspect of the report by the first recipient comprises storing delivery data that defines the print delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the print delivery mechanism.

19. The system of claim 11:

wherein receiving, from the first recipient included in the multiple, different recipients, input attempting to personalize the delivery aspect of the report comprises receiving, from the first recipient included in the multiple, different recipients, input attempting to select a file delivery mechanism for the report;

wherein storing delivery data that defines personalization of the delivery aspect of the report by the first recipient comprises storing delivery data that defines the file delivery mechanism for the first recipient; and wherein delivering the first version of the report to the first recipient using the first delivery mechanism defined by the delivery data that defines personalization of the delivery aspect of the report by the first recipient comprises delivering the first version of the report to the first recipient using the file delivery mechanism.

20. The system of claim 11, wherein generating first and second versions of the report comprises:

accessing subscription data defining a subscription for a report;

identifying multiple, different recipients of the report based on the subscription data;

accessing profile data for each of the multiple, different recipients of the report;

identifying data needed from a database based on the subscription data and the profile data;

accessing the identified data from the database;

formatting the accessed data into a customized version of the report for each of the multiple, different recipients based on the profile data; and configuring each customized version of the report for sending to the corresponding recipient using an appropriate delivery mechanism for the corresponding recipient.

\* \* \* \* \*